United States Patent
Kim

[19]

[11] Patent Number: 6,151,082

[45] Date of Patent: Nov. 21, 2000

[54] HORIZONTAL FOCUS CONTROLLING APPARATUS FOR CATHODE-RAY TUBE

[75] Inventor: Yong-sub Kim, Seoul, Rep. of Korea

[73] Assignee: Samsung Electronics, Co., Ltd., Suwon, Rep. of Korea

[21] Appl. No.: 08/936,231

[22] Filed: Sep. 24, 1997

[30] Foreign Application Priority Data

Oct. 16, 1996 [KR] Rep. of Korea ............... 96-46321

[51] Int. Cl.[7] .......................... H04N 3/22; H04N 9/28
[52] U.S. Cl. ............................ 348/806; 315/368.21
[58] Field of Search ........................ 348/806, 807, 348/745, 746, 747; 315/382, 382.1, 368.11, 368.18, 368.21, 368.23, 368.24, 370; H04N 3/22, 9/28

[56] References Cited

U.S. PATENT DOCUMENTS

| | | | |
|---|---|---|---|
| 5,436,677 | 7/1995 | Suzuki et al. | 348/806 |
| 5,596,248 | 1/1997 | Hosoi et al. | 348/807 |
| 5,831,400 | 11/1998 | Kim | 315/382.1 |
| 5,923,387 | 7/1999 | Van Der Sanden | 348/806 |

*Primary Examiner*—Michael H. Lee
*Attorney, Agent, or Firm*—Marger Johnson & McCollom, P.C.

[57] ABSTRACT

The present invention relates to a horizontal focus controlling apparatus which compensates for a distortion generated on a screen of a computer or a TV set. The apparatus includes select signal generating means for dividing the period of a sawtooth signal into a falling portion, a rising portion located before the central point of the positive pulse of a flyback pulse signal, and a rising portion after the central point of the positive pulse of the flyback pulse signal and generating first, second, and third select signals synchronized with the respective portions and parabola signal generating means for generating a parabola signal which is synchronized with the flyback pulse signal by controlling the sawtooth signal according to the selections of the first, second, or third select signals.

18 Claims, 6 Drawing Sheets

HORIZONTAL FOCUS CONTROLLING APPARATUS FOR CATHODE-RAY TUBE

FIELD OF THE INVENTION

The present invention relates to a horizontal focus controlling apparatus for compensating for distortion generated on a cathode-ray tube (CRT) screen such as a computer or a TV set, and more particularly, to a horizontal focus controlling apparatus and method for making a horizontal parabola signal coincide with a phase of a flyback pulse (FBP) signal.

BACKGROUND OF THE INVENTION

In computer apparatus and televisions as well, cathode-ray tubes (CRTs) are often used to provide visual signal image output. The generalized modern CRT consists of an electron-beam-forming system, electron-beam deflecting system, phosphor screen, and evacuated envelope. The electron beam is formed in the electron gun, where it is modulated and focused, and then travels through the deflection region, where it is directed toward a specific spot or sequence of spots on the phosphor screen. At the phosphor screen the electron beam gives up some of the energy of the electrons in producing light or other radiation, some in generating secondary electrons, and the remainder producing heat. Typically, the screen has a convex surface as opposed to a flat surface.

In producing a picture upon the CRT screen, a succession of horizontal scan lines (providing a sequence of dots) is generated. Typically, the horizontal scan lines move from the upper left corner of the picture and proceed to the right with a slightly downward orientation. This succession of active scan lines and active retraces continues until a point near the middle of the bottom of the picture is reached. The spot then rapidly moves upward to the midpoint of the top of the frame, and the downward scan and retrace motions are repeated. A problem occurs in that signals for generating the horizontal scan lines are provide on the basis that the screen is flat, when in fact it is convex to varying degrees depending upon the CRT. Such a difference causes distortion in the horizontal focus which is observed by a viewer when the horizontal scan line signal is not accordingly compensated for delivery to a convex screen.

In conventional technology, the horizontal focus controller compensates for the distort on of the CRT screen by generating a parabola signal corresponding to a curved surface the CRT screen and outputting it with a horizontal scan signal. Additionally, a horizontal parabola signal should be synchronized with a flyback pulse to control such a horizontal focus. The flyback pulse is generated when the electron beam reaches the right edge of the CRT. The flyback pulse causes the beam to be rapidly deflected from the right edge of the CRT to the left edge so that the beam may move across the screen from left to right again.

An input synchronizing signal includes both the horizontal and vertical synchronizing signals In the vertical direction, a vertical synchronizing signal occurs once for each horizontal scan. Since a horizontal portion of the CRT has a higher operating frequency than a vertical portion of the CRT, the output gain and the phase of the parabola signal should hardly change based upon the vertical synchronizing signal. Also, since the CRT operates in a multi-synchronizing method, the above-mentioned conditions should be met with respect to all the horizontal synchronizing signal frequencies. While there is no problem based upon the vertical synchronizing signal, there is however, problem in that the output gain and the phase of the parabola signal change according to the initial input synchronizing signal frequency in a conventional technology. Accordingly, an unstable parabola signal will no properly compensate for the distortion due to the convex surface of the CRT and cause a distorted screen on the CRT.

SUMMARY OF THE INVENTION

It is an object of the present invention to provide a horizontal focus controlling apparatus for making a parabola output signal coincide with the phase of a flyback pulse signal. A predetermined signal is generated and divides a sawtooth signal into a plurality of portions. Select signals which are synchronized with the sawtooth portions are generated and operate on the parabola signal in a manner which provides control of the horizontal focus in a CRT. That is, a parabola signal is generated which is synchronized with the flyback pulse signal by controlling the sawtooth signal according to the selections of the select signals.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention is described with reference to the attached drawings.

To correct the instability of the parabola signal and thus the horizontal focus, this invention provides a non-distorted parabola signal whose phase coincides with that of the flyback pulse. Elimination of the change in the output gain and the phase of the parabola signal with respect to the input synchronizing signal is effected by generating a predetermined select signal and dividing it into three different portions, SELECT 1, SELECT 2 and SELECT 3. These portions are combined with the parabola signal in a manner which results the synchronization of the parabola's phase with that of the flyback pulse.

Figure 1:
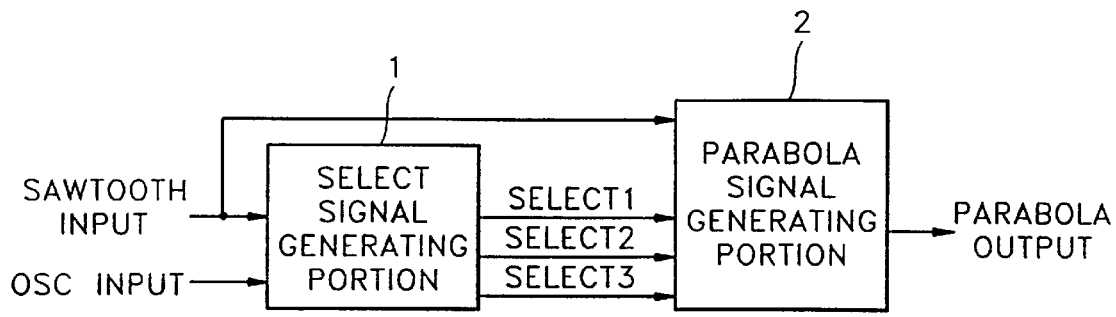
FIG. 1 shows a block diagram of a horizontal focus controlling apparatus for a cathode-ray tube according to the present invention.

FIG. 1 shows a block diagram of a horizontal focus controlling apparatus for a cathode-ray tube according to the present invention. The horizontal focus controlling apparatus includes a select signal generating unit 1 which inputs a sawtooth signal SAWTOOTH INPUT and a pulse signal OSC INPUT. The OSC INPUT is synchronized with a falling portion of the sawtooth signal SAWTOOTH INPUT. The period of the sawtooth signal from the SAWTOOTH INPUT is divided into three portions: a falling portion; a rising portion which is located before the central point of the positive pulse of a flyback pulse signal; and a rising portion after the central point. Predetermined select signals, namely first, second, and third select signals SELECT1, SELECT2 and SELECT3 are synchronized with the respective three portions of the sawtooth signal. A parabola signal generating portion 2 for generating a parabola signal PARABOLA OUTPUT is synchronized with the flyback pulse signal by controlling the sawtooth signal SAWTOOTH INPUT according to the selections of the first, second, or third select signals SELECT1, SELECT2 or SELECT3. The detailed description of the operation of the horizontal focus controlling apparatus will be followed with reference to FIG. 2, FIGS. 3A–3E, FIG. 4 and FIGS. 5A–5E.

Figure 2:
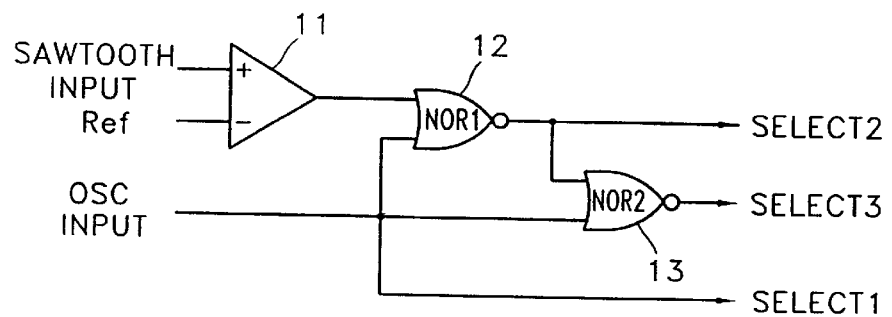
FIG. 2 shows a circuit diagram of the select signal generating portion shown in FIG. 1.
Figure 3A:
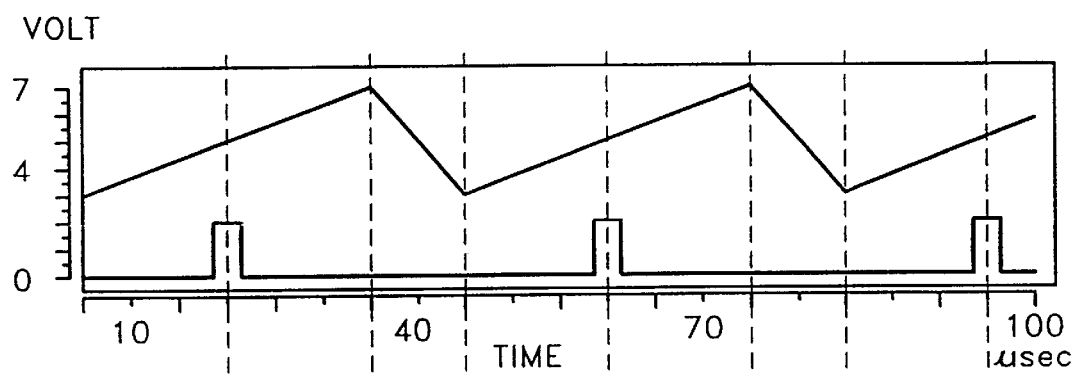
FIGS. 3A to 3E show a relationship between an input signal and an output signal of the select signal generating portion shown in FIG. 2.
Figure 3B:
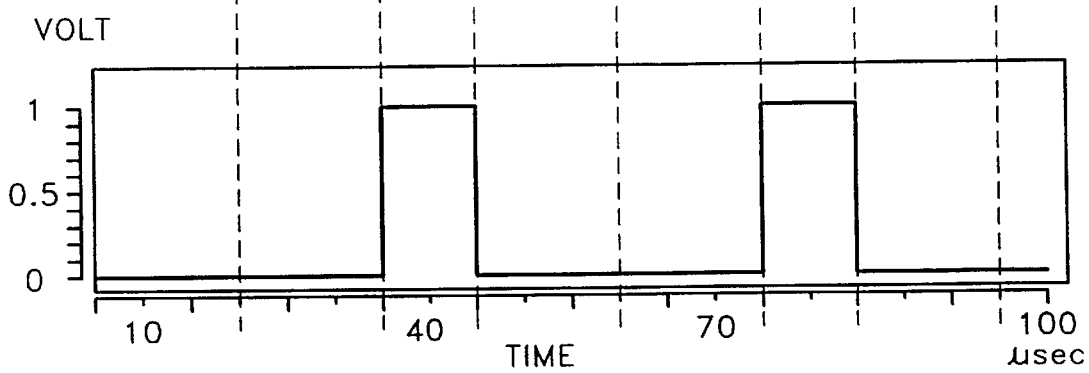
Figure 3C:
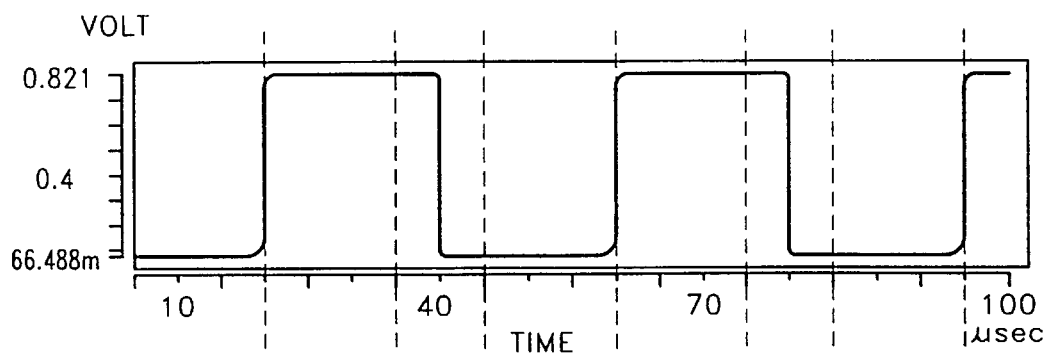
Figure 3D:
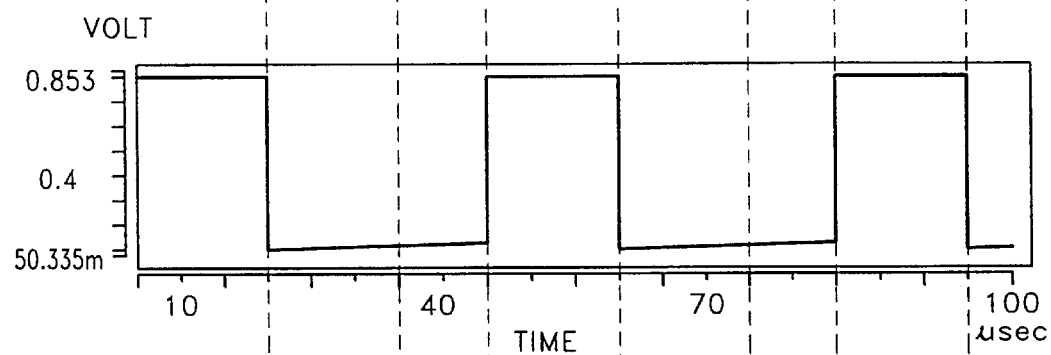
Figure 3E:
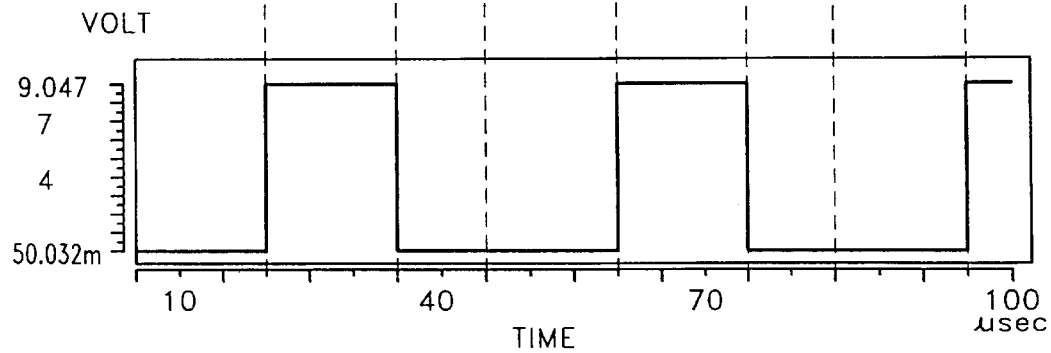

FIG. 2 shows a circuit diagram of the select signal generating portion 1 shown in FIG. 1. Specifically, FIG. 2 illustrates a manner in which to form first select signal SELECT 1, second select signal SELECT 2, and third select signal SELECT 3. FIG. 2 shows a comparator 11 outputs a signal which results when the sawtooth signal SAWTOOTH INPUT is compared with a threshold voltage Ref corresponding to a position of 0.375 T thereof. A first NOR gate 12 performs a logic NOR operation with respect to the output signal of the comparator 11 and the pulse signal (OSC INPUT) synchronized with a falling portion of the sawtooh signal SAWTOOTH INPUT and outputs the result. A second NOR gate 13 perform is a logic NOR operation with respect to the output signal of the first NOR gate 12 and the pulse signal (OSC INPUT) synchronized with the falling portion of the sawtooth signal SAWTOOTH INPUT and outputs the result. By doing so, the pulse signal (OSC INPUT) synchronized with the falling portion of the sawtooth signal SAWTOOTH INPUT, the output signal of the first NOR gate 12, and the output signal of the second NOR gate 13 respectively serve as the first select signal SELECT1, the second select signal SELECT2 and the third select signal SELECT3.

FIGS. 3A to 3E show a relationship between an input signal and an output signal of the signal generating portion 1 shown in FIG. 2. FIGS. 3A, 3B, 3C, 3D and 3E show waveforms of the sawtooth signal SAWTOOTH INPUT and a flyback pulse signal, the first select signal SELECT1, a comparator output signal, the second select signal SELECT2, and the third select signal SELECT3, respectively.

Figure 4:
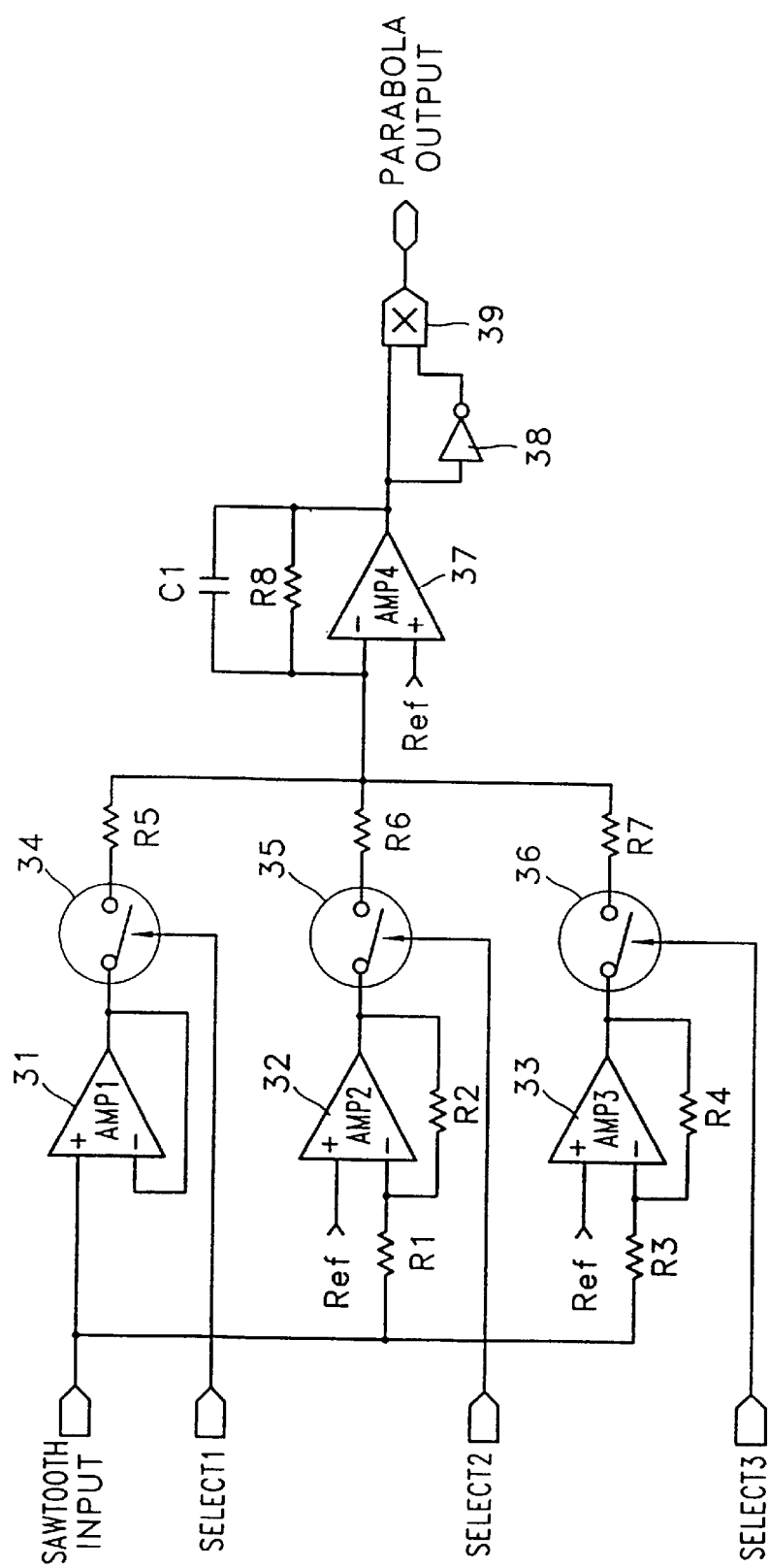
FIG. 4 shows the parabola signal generating portion shown in FIG. 1.

FIG. 4 shows a circuit diagram of the parabola signal generating portion 2 shown in FIG. 1 and FIGS. 5A–5E show a relationship between an input signal and an output signal of the signal generating portion 2 shown in FIG. 4. FIGS. 5A, 5B, 5C, 5D and 5E show waveform of the sawtooth signal SAWTOOTH INPUT, a fourth amplifier output signal, an inverted signal of the fourth amplifier output signal, the parabola output signal PARABOLA OUTPUT, and the flyback pulse signal.

Referring to FIG. 4, a reference voltage generator (not shown) generates a reference voltage Ref for controlling a direct current offset. A first amplifier 31 amplifies the sawtooth signal SAWTOOTH INPUT by unity gain and a first switch 34 outputs the output of the first amplifier 31 to a fourth amplifier 37 during a section selected by the first select signal SELECT1. A second amplifier 32 controls the direct current offset of the sawtooth signal SAWTOOTH INPUT according to the input reference voltage Ref and the sawtooth signal SAWTOOTH INPUT, and then inverts and amplifies it by a predetermined unit of gain and a second witch 35 outputs the output of the second amplifier 32 to the fourth amplifier 37 during a section selected by the second select signal SELECT2. A third amplifier 33 controls the direct current offset of the sawtooth signal SAWTOOTH INPUT according to the input reference voltage Ref and the sawtooth signal SAWTOOTH INPUT, and then inverts and amplifies it by a predetermined unit of gain and a third switch 36 outputs the output of the third amplifier 33 to the fourth amplifier 37 during a section selected by the third select signal SELECT 3. The fourth amplifier 37 inverts and amplifies the output signal of the first, second or third switch 34, 35 or 36 which is output according to the first, second or third select signal SELECT1, SELECT2 or SELECT3 by a gain based on the ratio of the rising section o the falling section of the sawtooth signal SAWTOOTH INPUT during the section in which the first select signal SELECT1 is activated and by a predetermined unit of gain during the other sections, and outputs the result. An inverter 38 inverts and outputs the output signal of the fourth amplifier 37. A multiplier 39 multiplies the output signal of the fourth amplifier 37 by that of the inverter 38 and generates the desired parabola signal PARABOLA OUTPUT. Here, reference characters R1–R8 indicate resistors and reference character C1 indicates a capacitor.

Figure 5A:
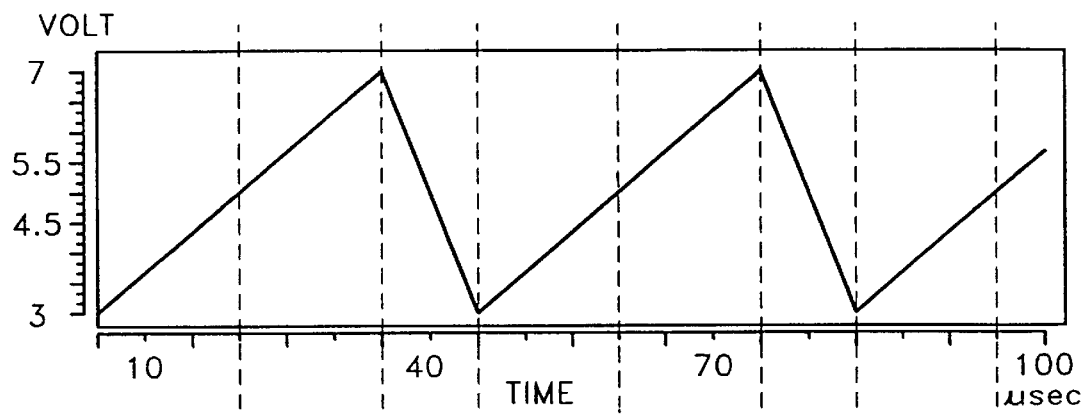
FIGS. 5A to 5E show a relationship between an input signal and an output signal of the parabola signal generating portion shown in FIG. 4.
Figure 5B:
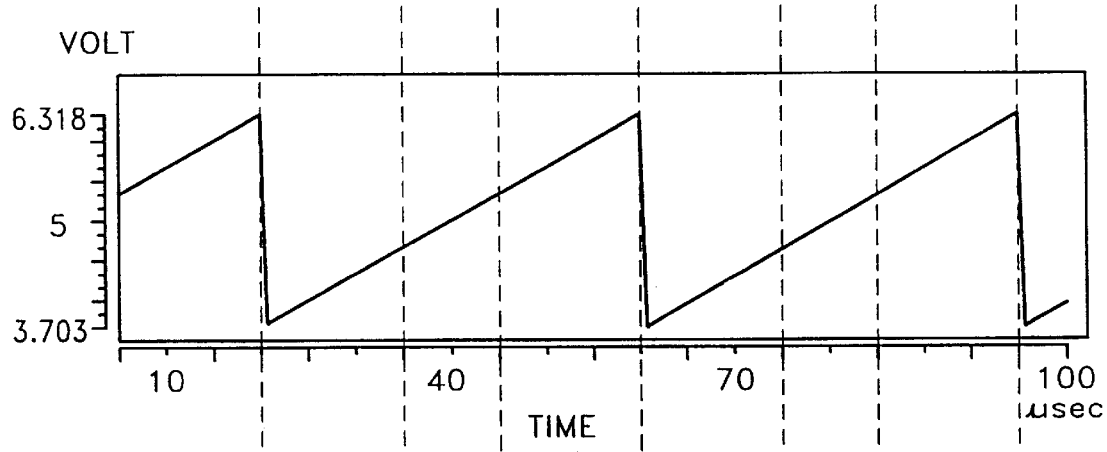
Figure 5C:
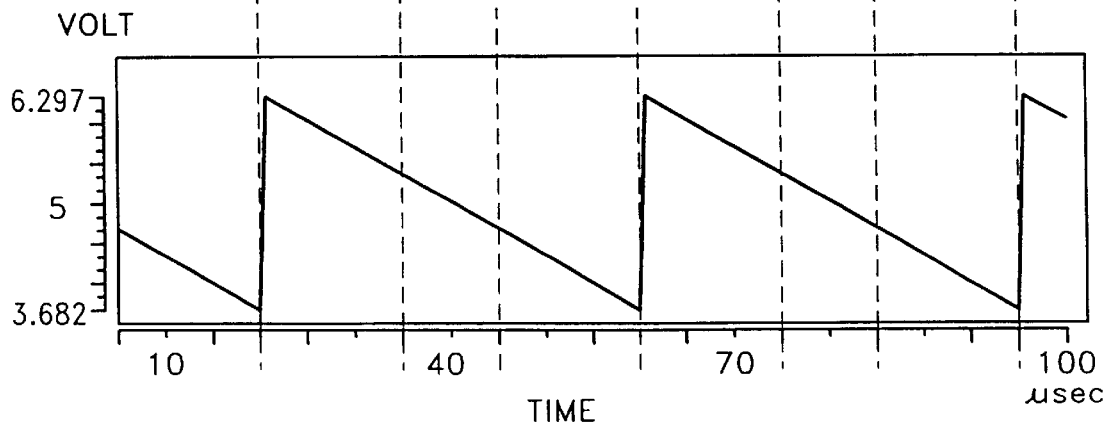
Figure 5D:
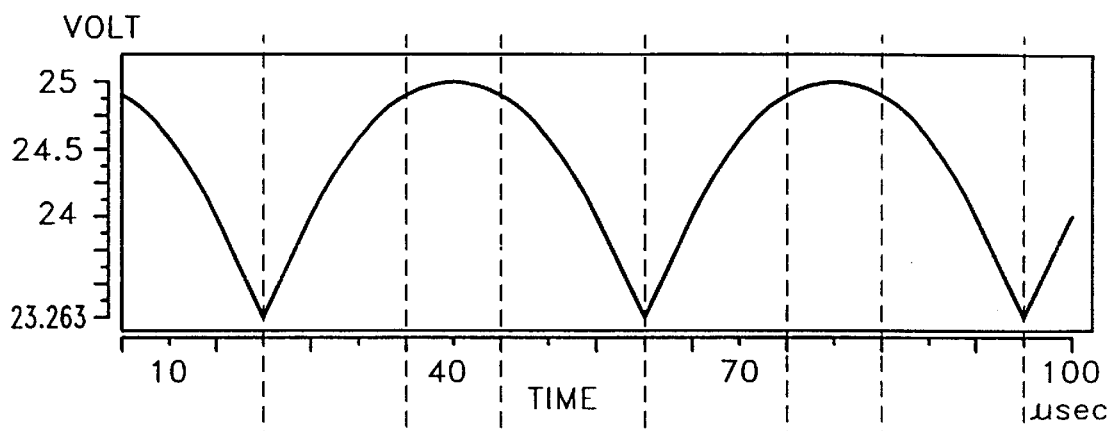
Figure 5E:
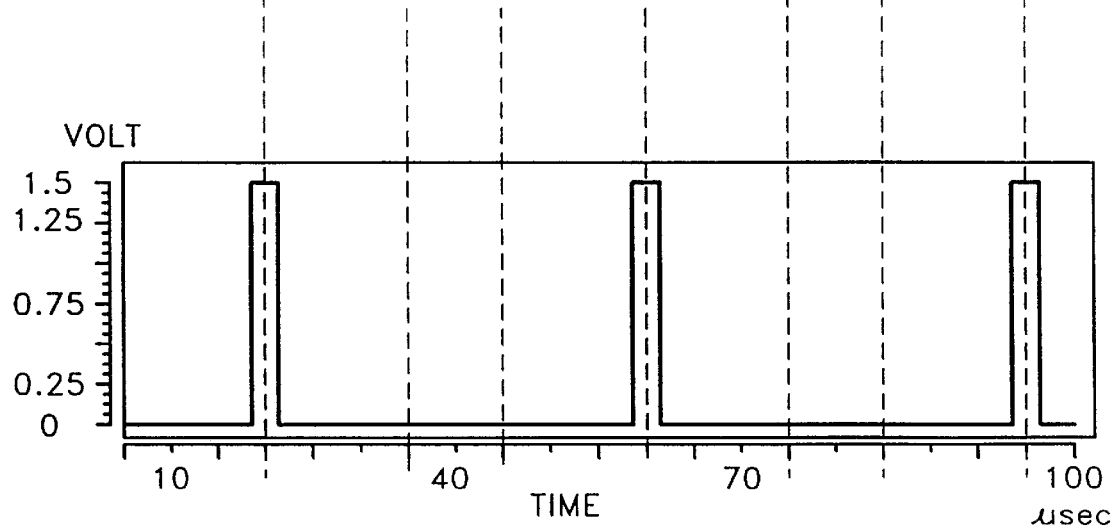

Referring to FIGS. 5A and 5B, it is noted that a sawtooth signal having uniform rising and falling portions can be used to generate a sawtooth signal having no falling section by the switching of a select signal. Referring FIGS. 5D and 5E, it is noted that the non-distorted parabola signal whose phase coincides with that of the flyback pulse signal can be generated by doing so. Other suitable signals may be used to replace the sawtooth signal so long as they may used in a manner which coincides with the phase of the flyback pulse.

According to the horizontal focus controlling apparatus for a cathode-ray tube according to the present invention, it is possible to generate the non-distorted parabola signal whose phase coincides with that of the flyback pulse signal and to utilize it to control the horizontal focus of the CRT screen by generating the parabola signal after generating the sawtooth signal having no falling section by dividing the section of a predetermined sawtooth signal and generating a select signal corresponding thereto.

What is claimed is:

1. A horizontal focus controlling apparatus for a cathode-ray tube for generating a parabola signal applied to control the horizontal focus, comprising:
   a predetermined signal generator configured to divide a sawtooth signal into signal portions in a manner in which at least one of said signal portions coincides with the phase of a flyback pulse signal;
   a parabola signal generator configured to generate a parabola signal which is synchronized with the flyback pulse signal responsive to at least one of said signal portions and said sawtooth signal.

2. A horizontal focus controlling apparatus for a cathode-ray tube as recited in claim 1, wherein said parabola signal generator generates a second sawtooth signal having no falling section, generates an inverse sawtooth signal, and multiplies the second sawtooth signal and the inverse sawtooth signal.

3. A horizontal focus controlling apparatus for a cathode-ray tube as recited in claim 1, wherein said portions are two in number.

4. A horizontal focus controlling apparatus for a cathode-ray tube as recited in claim 1, wherein said portions are three in number.

5. A horizontal focus controlling apparatus for a cathode-ray tube as recited in claim 4 wherein said portions are a falling portion, a rising portion located before a central point of a positive pulse of the flyback pulse signal, and a rising portion after the central point of the positive pulse of the flyback pulse signal.

6. A horizontal focus controlling apparatus for a cathode-ray tube as recited in claim 5, wherein the predetermined signal generator includes:
   a select signal generator configured to generate first, second, and third select signals synchronized with the falling portion, the rising portion before the central point of the positive pulse of the flyback pulse signal, and the rising portion after the central point of the positive pulse of the flyback pulse signal, respectively.

7. A horizontal focus controlling apparatus for a cathode-ray tube as recited in claim 6, wherein said parabola signal generator is configured to generate the parabola signal which is synchronized with the flyback pulse signal by generating a second sawtooth signal responsive to the first, second or third select signal.

8. A method for controlling the horizontal focus of a cathode-ray tube for generating a parabola signal applied to control the horizontal focus, comprising:
   dividing a sawtooth signal into signal portions in a manner in which at least one of said signal portions coincides with the phase of the flyback pulse signal;
   generating a parabola signal responsive to at least one of said signal portions and said sawtooth signal in a manner which operates to synchronize said flyback pulse phase with said parabola signal.

9. A method for controlling the horizontal focus of a cathode-ray tube as recited in claim 8, wherein generating a parabola signal includes generating a second sawtooth signal having no falling section, generating an inverse sawtooth signal, and multiplying the second sawtooth signal and the inverse sawtooth signal.

10. A method for controlling the horizontal focus of a cathode-ray tube as recited in claim 8, wherein said portions are two in number.

11. A method for controlling the horizontal focus of a cathode-ray tube as recited in claim 8, wherein said portions are three in number.

12. A method for controlling the horizontal focus of a cathode-ray tube as recited in claim 11, wherein said portions are a falling portion, a rising portion located before a central point of a positive pulse of the flyback pulse signal, and a rising portion after the central point of the positive pulse of the flyback pulse signal.

13. A method for controlling the horizontal focus of a cathode-ray tube as recited in claim 12, further comprising the step of:
   generating first, second and third select signals which are synchronized with the falling portion, the rising portion before the central point of the positive pulse of a flyback pulse signal, and the rising portion after the central point of the positive pulse of the flyback pulse signal, respectively.

14. A method for controlling the horizontal focus of a cathode-ray tube as recited in claim 13, further comprising the step of:
   controlling the parabola signal so that the parabola signal is synchronized with the flyback pulse signal according to selections of the first, second or third select signal.

15. A horizontal focus controlling apparatus for a cathode-ray tube for generating a parabola signal applied to control the horizontal focus, said apparatus comprising:
   select signal generating means for dividing the period of a sawtooth signal into a falling portion, a rising portion located before a central point of a positive pulse of the flyback pulse signal, and a rising portion after the central point of the positive pulse of the flyback pulse signal and generating first, second, and third select signals synchronized with the respective portions; and
   parabola signal generating means for generating a parabola signal which is synchronized with the flyback pulse signal by controlling the sawtooth signal responsive to the selections of the first, second, or third select signals and the sawtooth signal.

16. A horizontal focus controlling apparatus for a cathode-ray tube for generating a parabola signal applied to control the horizontal focus, said apparatus comprising:
   select signal generating means for dividing the period of a sawtooth signal into a falling portion, a rising portion located before a central point of a positive pulse of the flyback pulse signal, and a rising portion after the central point of the positive pulse of the flyback pulse signal and generating first, second, and third select signals synchronized with the respective portions; and
   parabola signal generating means for generating a parabola signal which is synchronized with the flyback pulse signal by controlling the sawtooth signal according to the selections of the first, second, or third select signals;
   wherein said select signal generating means comprises:
      a signal generator for generating a pulse signal which is synchronized with a falling portion of the sawtooth signal as the first select signal;
      a comparator for outputting a signal which results when the sawtooth signal is compared with a threshold voltage corresponding to a predetermined position of the sawtooth signal;
      a first NOR gate for performing a logic NOR operation with respect to the compared signal and the pulse signal and outputting the result as the second select signal;
      a second NOR gate for performing a logic NOR operation with respect to the output signal of said first NOR gate and the pulse signal and outputting the result as the third select signal.

17. A horizontal focus controlling apparatus for a cathode-ray tube for generating a parabola signal applied to control the horizontal focus, said apparatus comprising:
   select signal generating means for dividing the period of a sawtooth signal into a falling portion, a rising portion located before a central point of a positive pulse of the flyback pulse signal, and a rising portion after the central point of the positive pulse of the flyback pulse signal and generating first, second, and third select signals synchronized with the respective portions; and
   parabola signal generating means for generating a parabola signal which is synchronized with the flyback pulse signal by controlling the sawtooth signal according to the selections of the first, second, or third select signals;
   wherein said parabola signal generating means comprises:
      reference voltage generating means for generating a reference voltage for controlling a direct current offset;
      first amplifying means for amplifying the sawtooth signal by a predetermined unit of gain during a section selected by the first select signal;
      second amplifying means for controlling the direct current offset of the sawtooth signal according to the input reference voltage and the input sawtooth signal and then inverting and amplifying it by a predetermined unit of gain during the section selected by the second select signal;

third amplifying means for controlling the direct current offset of the sawtooth signal according to the input reference voltage and the input sawtooth signal and then inverting and amplifying it by a predetermined unit of gain during the section selected by the third select signal;

fourth amplifying means for inverting and amplifying the output signal of one of said first, second and third amplifying means by a gain based on the ratio of the rising section to the falling section of the sawtooth signal during the section in which the first select signal is activated and by a predetermined unit of gain during the other sections and outputs the result;

inverting means for inverting the output of said fourth amplifying means; and multiplying means for generating the parabola signal by multiplying the output signal of said fourth amplifying means by the output of said inverting means.

18. A horizontal focus controlling apparatus for a cathode-ray tube as claimed in claim 16, wherein said parabola signal generating means comprises:

reference voltage generating means for generating a reference voltage for controlling a direct current offset;

first amplifying means for amplifying the sawtooth signal by a predetermined unit of gain during a section selected by the first select signal;

second amplifying means for controlling the direct current offset of the sawtooth signal according to the input reference voltage and the input sawtooth signal and then inverting and amplifying it by a predetermined unit of gain during the section selected by the second select signal;

third amplifying means for controlling the direct current offset of the sawtooth signal according to the input reference voltage and the input sawtooth signal and then inverting and amplifying it by a predetermined unit of gain during the section selected by the third select signal;

fourth amplifying means for inverting and amplifying the output signal of one of said first, second and third amplifying means by a gain based on the ratio of the rising section to the falling section of the sawtooth signal during the section in which the first select signal is activated and by a predetermined unit of gain during the other sections and outputs the result;

inverting means for inverting the output of said fourth amplifying means; and multiplying means for generating the parabola signal by multiplying the output signal of said fourth amplifying means by the output of said inverting means.

* * * * *

UNITED STATES PATENT AND TRADEMARK OFFICE
CERTIFICATE OF CORRECTION

PATENT NO.   : 6,151,082
DATED        : November 21, 2000
INVENTOR(S)  : Kim

It is certified that error appears in the above-identified patent and that said Letters Patent is hereby corrected as shown below:

Column 1,
Line 14, "apparatus" should read -- apparatus' --.

Column 2,
Line 4, "will no properly" should read -- will not properly --.
Line 55, "results the" should read -- results in the --.

Column 3,
Line 24, "performs is a logic" should read -- performs a logic --.

Column 4,
Line 9, "section o the" should read -- section of the --.

Signed and Sealed this

Nineteenth Day of November, 2002

Attest:

Attesting Officer

JAMES E. ROGAN
Director of the United States Patent and Trademark Office